United States Patent [19]

Farris

[11] Patent Number: 5,301,984

[45] Date of Patent: Apr. 12, 1994

[54] WEAR RESISTANT PIPE ELBOW

[76] Inventor: Sam J. Farris, 727 Ash, Ardmore, Okla. 73401

[21] Appl. No.: 4,323

[22] Filed: Jan. 14, 1993

[51] Int. Cl.⁵ .................................... F16L 9/14
[52] U.S. Cl. ................................ 285/55; 285/179; 285/911
[58] Field of Search ............... 285/55, 179, 911; 406/193, 195

[56] References Cited

U.S. PATENT DOCUMENTS

| | | | |
|---|---|---|---|
| 3,235,290 | 2/1966 | Young | 285/179 X |
| 3,794,359 | 2/1974 | Fisher | 285/179 X |
| 3,844,586 | 10/1974 | Olen | 285/179 X |
| 4,363,504 | 12/1982 | De Feu et al. | 285/55 X |
| 4,387,914 | 6/1983 | Paulson et al. | 285/179 X |
| 4,447,076 | 5/1984 | Evans | 285/179 X |
| 4,606,556 | 8/1986 | Metzger | 285/179 X |
| 4,621,953 | 11/1986 | McGuth | 406/193 |
| 4,653,777 | 3/1987 | Kawatsu | 285/55 X |
| 4,684,155 | 8/1987 | Davis | 285/55 X |
| 4,685,353 | 9/1989 | Osborne | 285/55 X |
| 4,995,645 | 2/1991 | Pausch | 295/179 X |
| 5,060,984 | 10/1991 | Hess | 285/179 X |

*Primary Examiner*—Dave W. Arola
*Attorney, Agent, or Firm*—Dunlap, Codding & Lee

[57] ABSTRACT

A wear resistant pipe elbow is provided having a seamless inner liner with an upstream beveled end directing fluid flow away from the interior surface of the pipe elbow, thereby protecting the interior surface of the pipe elbow from abrasive particles contained in the fluid, and a downstream beveled end, which assists in directing fluid flow away from the inner surface of downstream pipe sections. The pipe elbow may also include a particle trap cavity, which traps particles suspended in the fluid flow. The trapped particles act as a buffer between a portion of the interior surface of the pipe elbow and particles subsequently carried in the fluid flow, thereby additionally protecting a portion of the interior surface of the pipe elbow from abrasion.

9 Claims, 4 Drawing Sheets

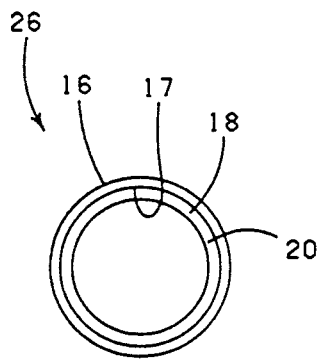
FIG. 2
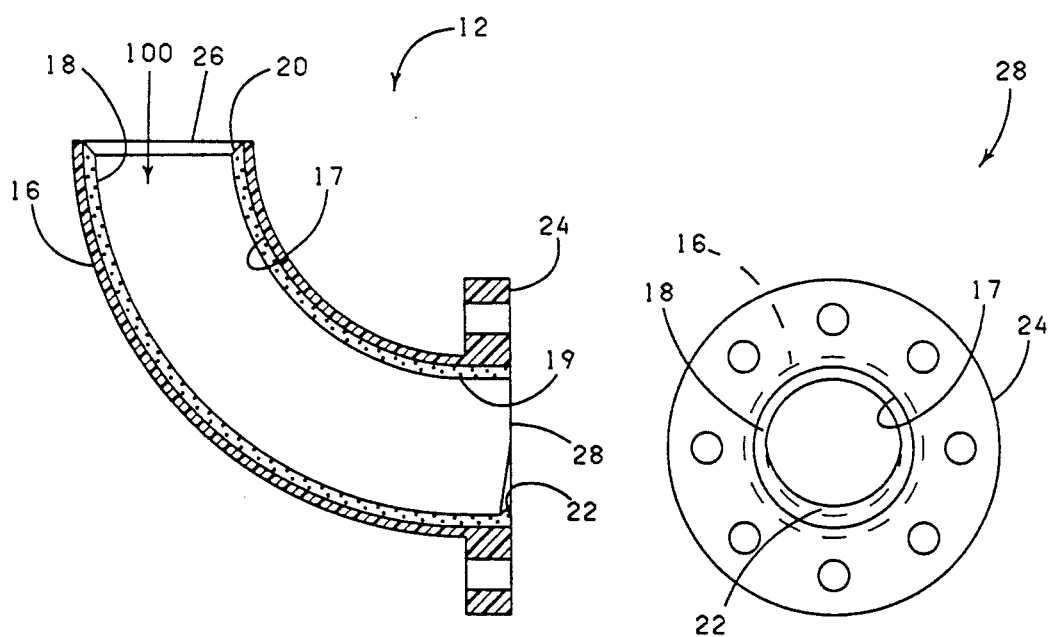
FIG. 1
FIG. 3

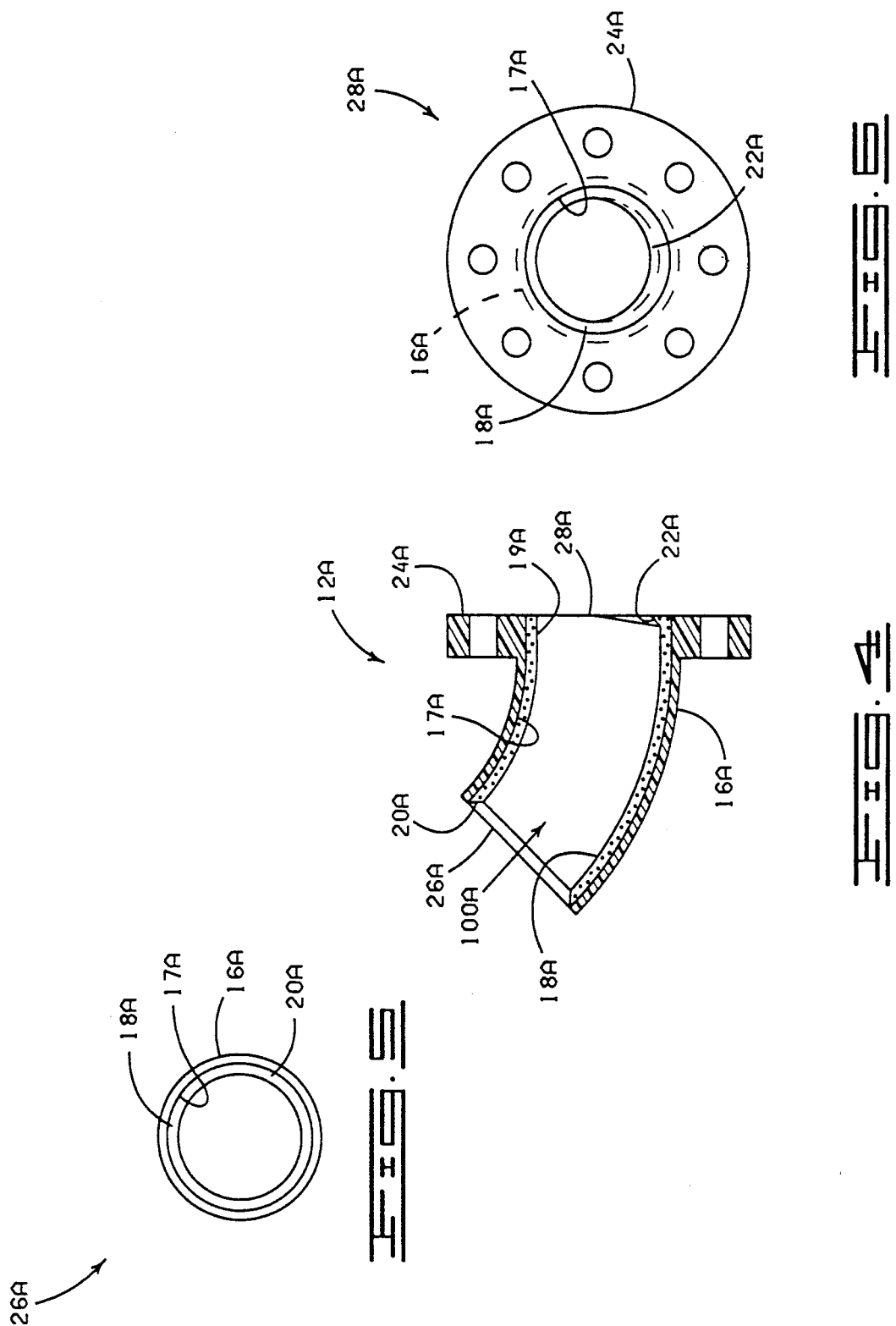

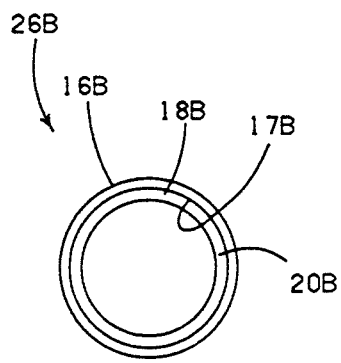
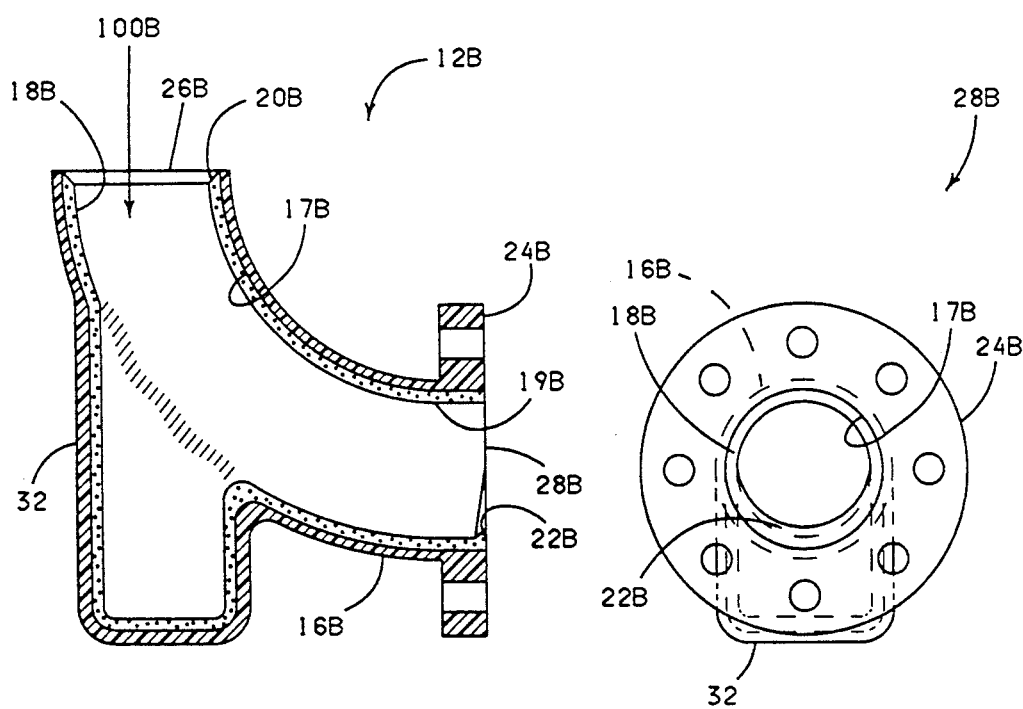
  

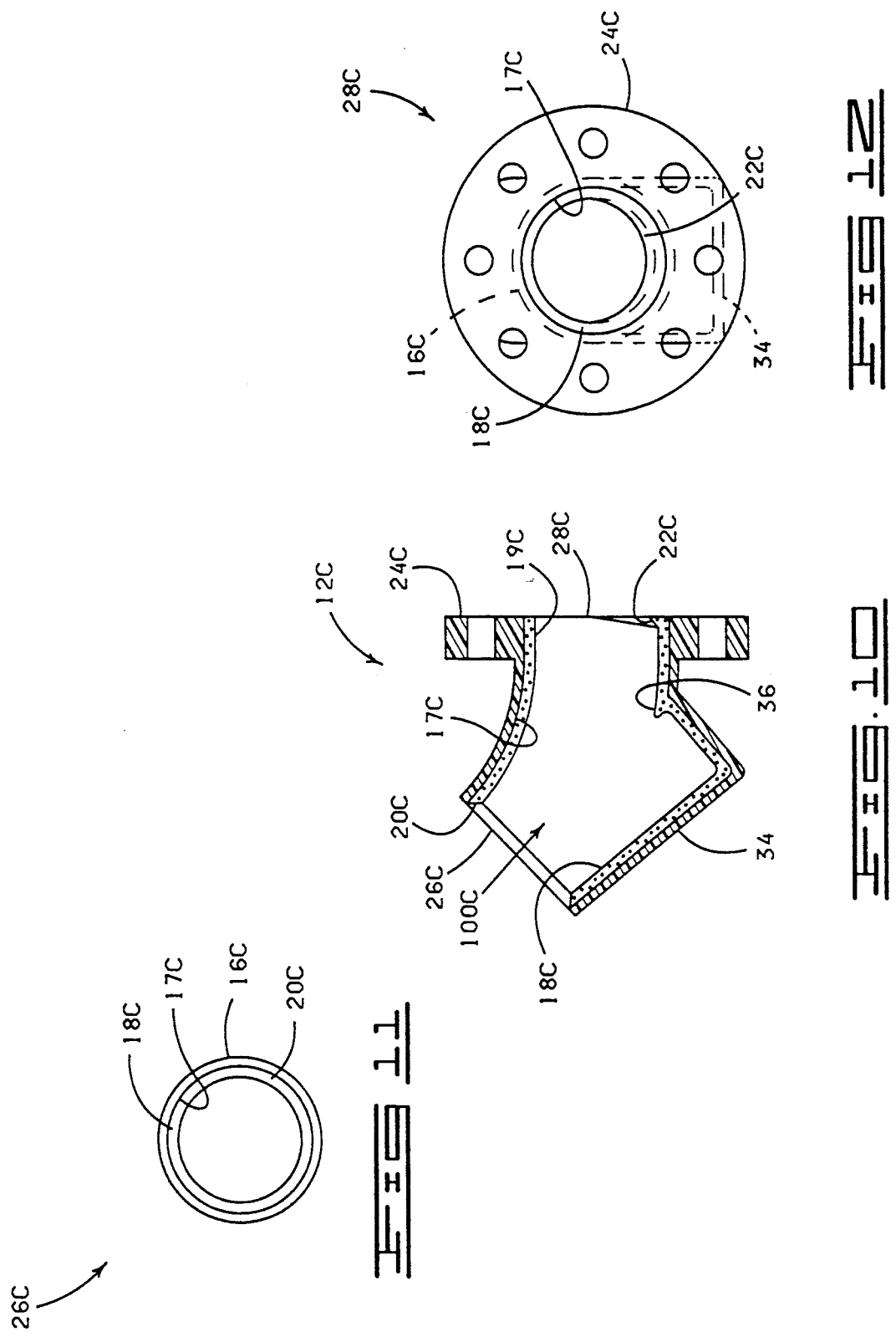

WEAR RESISTANT PIPE ELBOW

FIELD OF THE INVENTION

The present invention relates generally to abrasion resistant pipe fittings.

BRIEF DESCRIPTION OF THE DRAWINGS

FIG. 1 is a cross sectional view of a ninety degree pipe elbow constructed in accordance with the present invention.

FIG. 2 is an upstream end view of the ninety degree pipe elbow shown in FIG. 1.

FIG. 3 is a downstream end view of the ninety degree pipe elbow shown in FIG. 1.

FIG. 4 is a cross sectional view of a forty-five degree pipe elbow constructed in accordance with the present invention.

FIG. 5 is an upstream end view of the forty-five degree pipe elbow shown in FIG. 4.

FIG. 6 is a downstream end view of the forty-five degree pipe elbow shown in FIG. 4.

FIG. 7 is a cross sectional view of a ninety degree pipe elbow with a particle trap cavity constructed in accordance with the present invention.

FIG. 8 is an upstream end view of the ninety degree pipe elbow shown in FIG. 7.

FIG. 9 is a downstream end view of the ninety degree pipe elbow shown in FIG. 7, including an end view of the particle trap cavity.

FIG. 10 is a cross sectional view of a forty-five degree pipe elbow with a particle trap cavity constructed in accordance with the present invention.

FIG. 11 is an upstream end view of the forty-five degree pipe elbow shown in FIG. 10.

FIG. 12 is a downstream end view of the forty-five degree pipe elbow shown in FIG. 10, including an end view of the particle trap cavity.

DESCRIPTION OF THE PREFERRED EMBODIMENTS

Referring to the drawings in detail, and particularly to FIGS. 1-3, the present invention comprises a wear resistant pipe elbow (referred to hereinafter as "the pipe elbow") designated generally by the reference numeral 12. The pipe elbow 12 includes an outer shell 16 constructed of fiberglass. The outer shell 16 includes an upstream end 26, a downstream end 28, and an interior surface 17. The outer shell 16 additionally includes means to connect the pipe elbow 12 into a pipeline. In FIG. 1, a flange 24 is shown as the connecting means, but the connecting means may comprise threaded connectors or other means.

As shown in FIG. 1, a seamless liner 18 extends substantially over the interior surface 17 of the outer shell 16. The seamless liner 18, in a preferred embodiment, is constructed of ceramic, ceramic composite, or porcelain. The seamless liner 18 may also include a glazed or polished inner surface 19.

As shown in FIGS. 1 and 2, the upstream end of the seamless liner 18 is bevelled to provide a beveled annular end 20, tapered from the outer to the inner surface of the seamless liner 18 in a generally downstream direction. The beveled annular end 20 is located adjacent to the upstream end 26 of the outer shell 16 and extends circumferentially around the upstream end 26 of the outer shell 16, as shown in FIG. 2.

The downstream end of the seamless liner 18 further includes a half annular lip end 22, slanting generally inward toward the center of the pipe elbow 12 in a downstream direction. The half annular lip end 22 is located generally adjacent to the downstream end 28 of the outer shell 16, and is located radially outward from the center of the downstream end 18. The half annular lip end 22 extends around approximately half the circumference of the downstream end 28, as shown in FIG. 3.

FIGS. 4, 5, and 6 show a pipe elbow 12a. The pipe elbow 12a is constructed in exactly the same manner as the pipe elbow 12 shown in FIGS. 1, 2, and 3, except that the pipe elbow 12 may be characterized as a 90° bend pipe elbow, whereas the pipe elbow 12a may be characterized as a 45° bend pipe elbow. The features of the pipe elbow 12a which correspond to the features of the pipe elbow 12 are given the same reference numbers with a subscript "a".

It is understood that pipe elbows with different degrees of bend may be constructed in accordance with the present invention, and that the degree of bend will generally vary between about 10° and about 90°.

In operation, corrosive or noncorrosive fluids ("fluids" being defined herein to include liquids and slurries) containing suspended particles enter the pipe elbow 12 or 12a and flow in a direction 100 or 100a through the pipe elbow 12 or 12a. Normally when the direction of a fluid flow is changed, as in a pipe elbow, the wall of the elbow in the path of the fluid flow faces a constant barrage of particles suspended in the fluid. However, in the present invention, the beveled annular end 20 or 20a directs the fluid flow to the center of the pipe elbow 12 or 12a, and additionally causes the fluid flow to speed up slightly. The combination of direction and increased speed tends to keep suspended particles in the center of the pipe elbow 12 or 12a, and therefore decreases the abrasive effect of the particles on the seamless liner 18 or 18a of the pipe elbow 12 or 12a.

Additional abrasion resistance is provided by the use of a seamless liner 18 or 18a, which has no cracks or depressions upon which abrasive material may snag. The use of abrasion resistant materials in the construction of the seamless liner 18 or 18a, and the addition of a glazed or polished inner surface 19 or 19a to the seamless liner 18 or 18a, further increases the abrasion resistance of the seamless the pipe elbow 18 or 18a. In a preferred embodiment, the seamless liner 18 or 18a cooperating with an outer shell 16 or 16a constructed of fiberglass, acts to reduce the effect of corrosion on the pipe elbow 12 or 12a.

As the particle laden fluid leaves the pipe elbow 12 or 12a, the half annular lip end 22 or 22a of the seamless liner 18 or 18a acts to redirect the flow slightly, to direct the flow away from the interior surface of downstream pipe sections connected to the pipe elbow 12 or 12a.

FIG. 7 shows a pipe elbow 12b constructed of the same materials as the pipe elbows 12 and 12a. The pipe elbow 12b has an outer shell 16b with an upstream end 26b, a downstream end 28b, an interior surface 17b, and a flange 24b. A seamless liner 18b extends substantially over the interior surface 17b of the outer shell 16b; the upstream end of the seamless liner 18b is beveled to provide a beveled annular end 20b, tapered from the outer to the inner surface of the seamless liner 18b in a generally downstream direction, and located adjacent to and extending circumferentially around the upstream end 26b of the outer shell 16b of the pipe elbow 12b (FIGS. 7 and 8).

The downstream end of the seamless liner 18b includes a half annular lip end 22b, slanting generally inward toward the center of the pipe elbow 12b in a downstream direction, and located generally adjacent to the radially outward portion of the downstream end 28b of the outer shell 16b. The half annular lip section 22b extends around approximately half the circumference of the downstream end 28b of the outer shell 16b of the pipe elbow 12b, as shown in FIGS. 7 and 9. The seamless liner 18b may also include a glazed or polished inner surface 19b.

The outer shell 16b of the pipe elbow 12b further includes a particle trap cavity 32, shown in FIGS. 7 and 9. The particle trap cavity 32 is lined with the seamless liner 18b and is located in the path of fluid flow which enters the pipe elbow 12b from a direction 100b. The particle trap cavity 32 is positioned on a portion of the outer shell 16b which is radially outward from the line of curvature of the pipe elbow 12b. The particle trap cavity 32 retains a portion of particles suspended in the fluid, so that additional particles carried into the pipe elbow 12b that might otherwise impact a radially outward portion of the seamless liner 18b would instead impact upon particles retained in the particle trap cavity 32, thereby at least partially protecting the seamless liner 18b from abrasion.

FIG. 10 shows a pipe elbow 12c constructed generally in the same manner as the pipe elbow 12b shown in FIGS. 7, 8, and 9. Shown in FIG. 10 is a pipe elbow 12c having an outer shell 16c with an upstream end 26c, a downstream end 28c, an interior surface 17c, and a flange 24c. A seamless liner 18c extends substantially over the interior surface 17c of the outer shell 16c; the upstream end of the seamless liner 18c is beveled to provide a beveled annular end 20c, tapered from the outer to the inner surface of the seamless liner 18c in a generally downstream direction, and located adjacent to and extending circumferentially around the upstream end 26c of the outer shell 16c of the pipe elbow 12c (FIGS. 10 and 11). The downstream end of the seamless liner 18c includes a half annular lip end 22c, slanting generally inward toward the center of the pipe elbow 12c in a downstream direction, and located generally adjacent to the radially outward portion of the downstream end 28c of the outer shell 16c, the half annular lip section 22c extending around approximately half the circumference of the downstream end 28c of the outer shell 16c of the pipe elbow 12c, as shown in FIGS. 10 and 12. The seamless liner 18c may also include a glazed or polished inner surface 19c.

The outer shell 16c of the pipe elbow 12c further includes a particle trap cavity 34, shown in FIGS. 11 and 12. The particle trap cavity 34 is lined with the seamless liner 18c and is located in the path of fluid flow which enters the pipe elbow 12c from a direction 100c. The particle trap cavity 34 is positioned on a portion of the outer shell 16c which is radially outward from the line of curvature of the pipe elbow 12c. In this embodiment, as shown in FIG. 10, a portion of the particle trap cavity 34 is incorporated into the upstream end 26c of the outer shell 16c of the pipe elbow 12c. The particle trap cavity 34 in this embodiment also includes a particle retention lip 36, incorporated into a downstream portion of the particle trap cavity 34. The particle retention lip 36 acts to retain particles in the particle trap cavity 34 which have settled out of the fluid flow entering the pipe elbow 12c from a direction 100c.

It will be appreciated that FIGS. 7, 8, and 9 show a pipe elbow 12b which may be characterized as having a 90° bend, whereas FIGS. 10, 11, and 12 show a pipe elbow 12c which may be characterized as having a 45° bend. Pipe elbows 12b or 12c having different degrees of bend may be constructed in accordance with the present invention. For a particular degree of bend, the location of the particle trap cavity 32 or 34 may be changed so that the particle trap cavity 32 or 34 is located in the path of fluid flow which enters the pipe elbow 12b or 12c from a direction 100b or 100c. The degree of bend of a pipe elbow 12b or 12c constructed in accordance with the present invention will generally vary from about 10° to about 90°.

Changes may be made in the combinations, operations, and arrangement of the various parts and elements described herein without departing from the spirit and scope of the invention as defined in the following claims.

What is claimed is:

1. A pipe elbow, comprising:
   an outer shell having an upstream end, a downstream end, and an interior surface defining an interior space; and
   a seamless liner extending substantially over the interior surface of the outer shell, the seamless liner including an outer and an inner surface and a beveled annular end tapered from the inner surface to the outer surface in a downstream direction, the beveled annular end being generally adjacent the upstream end of the outer shell, the seamless liner further including a half annular lip end generally adjacent to radially outward portion of the downstream end of the outer shell, the half annular lip end slanting generally in the downstream direction and extending a distance into the interior space.

2. The pipe elbow of claim 1 wherein the outer shell further comprises a particle trap cavity extending from a radially outward portion of the outer shell and positioned in the path of a fluid flowing into the interior space from the upstream end.

3. The pipe elbow of claim 2 wherein the particle trap cavity is located generally adjacent to the upstream end of the outer shell and a portion of the particle trap cavity is incorporated into the upstream end of the outer shell.

4. The pipe elbow of claim 3 wherein the particle trap cavity further comprises a particle retention lip incorporated into a downstream portion of the particle trap cavity and extending a distance into the interior space, providing an impediment to the fluid flowing into the interior space from the upstream end.

5. The pipe elbow of claim 1 wherein the outer shell is constructed of fiberglass.

6. The pipe elbow of claim 1 wherein the seamless liner is constructed of ceramic.

7. The pipe elbow of claim 1 wherein the seamless liner is constructed of ceramic composite.

8. The pipe elbow of claim 1 wherein the seamless liner is constructed of porcelain.

9. The pipe elbow of claim 1 wherein the seamless liner further comprises a glazed inner surface.

* * * * *

UNITED STATES PATENT AND TRADEMARK OFFICE
CERTIFICATE OF CORRECTION

PATENT NO. : 5,301,984

DATED : April 12, 1994

INVENTOR(S) : Sam J. Farris

It is certified that error appears in the above-indentified patent and that said Letters Patent is hereby corrected as shown below:

Column 2, line 47, after "18a", insert --by assisting the fluid flow through the pipe elbow 18 or 18a --.

Column 4, line 36, delete "to".

Signed and Sealed this

Twenty-seventh Day of September, 1994

Attest:

BRUCE LEHMAN

Attesting Officer

Commissioner of Patents and Trademarks